UNITED STATES PATENT OFFICE.

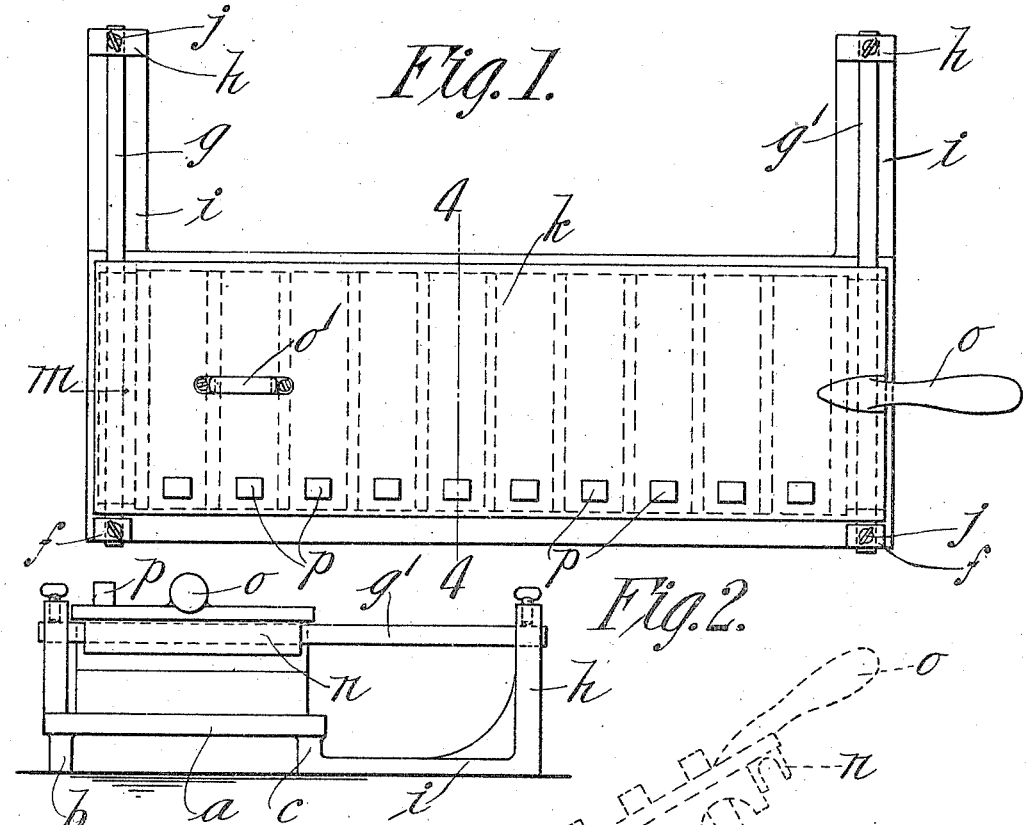
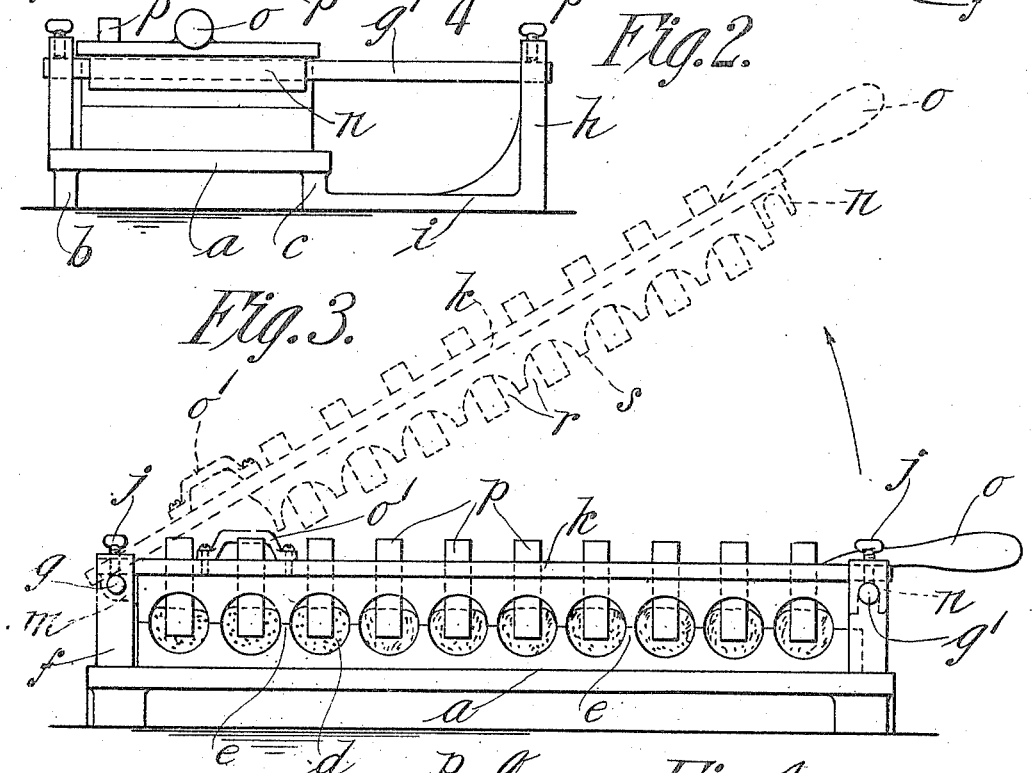

JULIUS NEWFIELD, OF CHICOPEE FALLS, MASSACHUSETTS.

DOUGH-SEVERING DEVICE.

950,727.

Specification of Letters Patent.  Patented Mar. 1, 1910.

Application filed March 25, 1909. Serial No. 485,776.

*To all whom it may concern:*

Be it known that I, JULIUS NEWFIELD, a subject of the Czar of Russia, residing at Chicopee Falls, in the county of Hampden and State of Massachusetts, have invented new and useful Improvements in Dough-Severing Devices, of which the following is a specification.

This invention relates to improvements in bakers' roll forming molds by means of which a large number of rolls can be formed of substantially equal size at the same time, the object of the invention being to decrease the labor required to form the rolls individually.

A further object of my invention is to provide a device by means of which the dough, after it has been rolled to a suitable thickness, can be quickly subdivided before placing in the baking pans.

Broadly, the invention consists of a base member and a cover member, hinged together, these members being provided with semi-circular recessed portions that are adapted to register with each other, whereby when the layers of rolled dough have been placed on the base member and the cover member has been brought downward, the dough will be simultaneously divided into as many parts as there are cup-shaped members; and, further, it consists in providing means for simultaneously ejecting all of the subdivided pieces of dough from the base member.

In the drawings forming part of this application,—Figure 1 is a top plan view of the device showing the cover element moved into position over the base portion. Fig. 2 is an end elevation of Fig. 1 looking from the right-hand end of Fig. 1 and clearly showing the rods for permitting the cover elements to be moved transversely of the machine during the removal of the cut or subdivided pieces of the dough. Fig. 3 is a side elevation of Fig. 1 showing in full lines the cover element down, and in dotted lines the same elevated. Fig. 4 is a sectional elevational view on the line 4—4 of Fig. 1.

Referring to these drawings in detail, $a$ designates the base portion of the device which is provided with suitable supporting legs $b$ and $c$ at the rear and forward portion thereof, the base portion $a$ being formed with a series of cup-shaped depressions $d$, semi-circular in cross section, and it will be noticed that these depressions are spaced from each other a short distance by means of a rib, as shown at $e$.

Extending upward from the base $a$ at the rear part of the device are posts $f$ for supporting one end of the rods $g$ and $g^1$, the other end of the rods being supported in an upright member $h$ which, as shown, is connected to the forward leg $c$ by means of the bar $i$. It will be noticed that this bar rests on the floor or table, as shown in Fig. 2. The rods $g$ and $g^1$ are locked in the posts $f$ and member $h$ by means of the thumb-screw $j$.

Pivotally and slidably secured to the rod $g$, at the left of Fig. 1, by means of the ears $m$, is a cover $k$, by means of which construction the cover may be raised from the horizontal to vertical position, as shown in Fig. 3; or it may be slid away from the base portion on the rods $g$ and $g^1$. The opposite end of the cover $k$ is provided with a U-shaped member $n$ which engages the rod $g^1$ so that when the cover is pushed away from the base, it may, if desired, be moved when down on the rod $g^1$.

$o$ designates a handle by means of which the cover may be readily elevated, and when used to slide the cover $k$, the handle $o^1$ is employed.

Located in the rear portion of the cover $k$ are a series of pins $p$ by means of which the subdivided pieces of dough, shown at $q$ may be simultaneously removed from the base portion when the cover $k$ is slid outward on the rods $g$ and $g^1$.

Referring now to the manner in which my improvement is used: after the dough has been rolled in the usual manner to the required thickness, it is placed on the base portion $a$, lengthwise thereof, it being understood that the cover $k$ is elevated when the dough is placed on the base part, and will be supported by means of the ribs $e$, which separate the recesses $d$ from each other. The cover is then brought downward into contact with the base portion $a$, and the recesses $r$ of the cover will then register with the recesses $d$ of the base, and the rib portions $s$ between the recesses $r$ will engage the dough that rests on the rib portions $e$ between the recesses $d$, whereby the dough will be separated into a series of equal parts; and if there is more than one row of dough extending lengthwise of the base $a$, all of the rolls will be simultaneously cut by means of the rib parts $e$ and $s$. After this operation, the cover is pushed outward on the rods $g$ and $g^1$ by means of the handles $o$ and $o^1$ and during this operation, the subdivided pieces of dough, as indicated at $q$, will all be removed from the recesses $d$, by means of the pins $p$. It will therefore be seen that I have invented a device that is a great saver in time when it is required that a large quantity of rolls or biscuits are to be cut.

What I claim, is:—

1. In a device of the class described having, in combination, a base-piece provided with a series of cup-shaped or pocket portions, a cover element pivotally and slidably connected to the base portion and having on the inner side thereof a series of cup-shaped or pocket portions that are adapted to register with the cup-shaped or pocket portions in the base-piece, ejector elements carried by the cover element, whereby material may be removed from the pocket portions of the base-piece.

2. In a device of the class described having, in combination, a base-piece provided with a series of cup-shaped or pocket portions, a cover element pivotally and slidably connected to the base portion and having on the inner side thereof a series of cup-shaped or pocket portions that are adapted to register with the cup-shaped or pocket portions in the base-piece, said series of cup-shaped or pocket portions being separated from each other by suitable ribs or web portions which engage each other, ejector elements carried by the cover element whereby when a layer of plastic material is placed on the base portion the same may be severed by the meeting edges of the ribs, as described, and whereby material may be removed from the pockets of the base-piece.

3. A device of the class described, a base portion having a series of pockets formed in the upper portion thereof, and separated from each other by a rib portion, a cover pivotally and slidably connected to the base portion and having means for engaging the rib portion of the base, the cover being also provided with a series of vertically arranged ejector elements, whereby when plastic material is placed in contact with the rib portion of the base the same will be severed when the cover is down, and when the cover is moved in a lateral direction the severed pieces of plastic material will be ejected from the cup or recessed portion of the base by means of said ejector elements.

4. In a dough severing device having in combination with a base portion, the upper surface of which is provided with a series of semi-circular recesses, the same being spaced from each other by means of rib portions, a cover secured to the base portion and provided with means for moving the same transversely of the base, and means carried by the cover portion for registering with the recesses of the base portion, the cover portion being provided with rib portions for registering with the rib portions of the base portion, whereby when plastic material is placed on the ribs of the base portion the same will be severed by the ribs of the cover, and whereby the severed pieces may be removed from the recesses of the base portion, when the cover is moved transversely.

JULIUS NEWFIELD.

Witnesses:
K. I. CLEMONS,
H. W. BOWEN.